Aug. 18, 1964  LA MAR ROY STEWART ETAL  3,144,899
PORTABLE MOTION PICTURE SCREEN
Filed Feb. 26, 1962
3 Sheets-Sheet 1
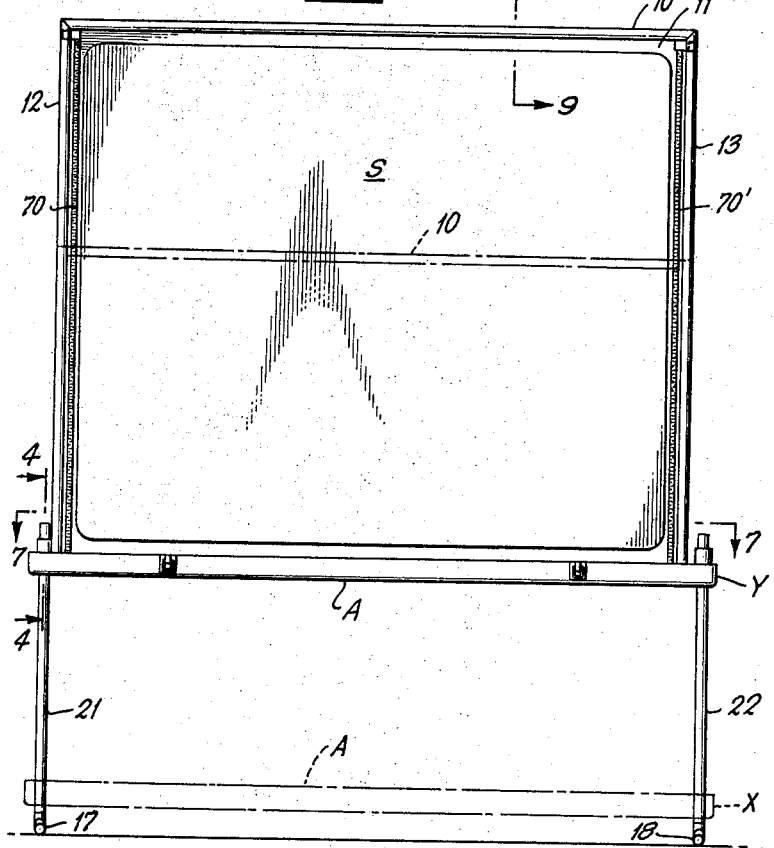
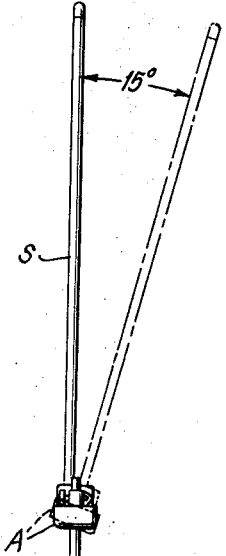
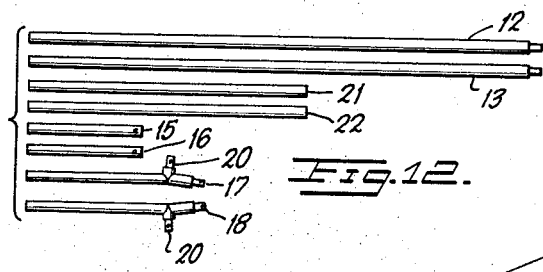
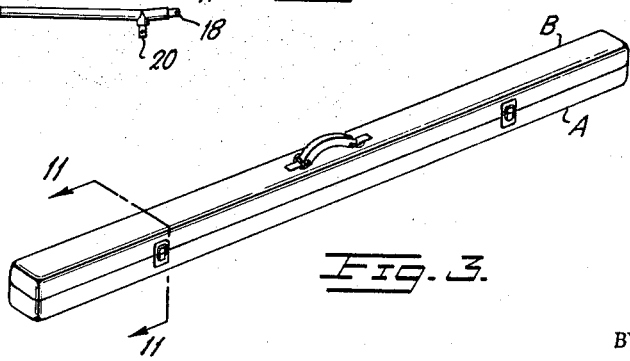
INVENTORS
La Mar Roy Stewart
BY Patrick H. Stewart
ATTORNEY Aug. 18, 1964 LA MAR ROY STEWART ETAL 3,144,899
PORTABLE MOTION PICTURE SCREEN
Filed Feb. 26, 1962 3 Sheets-Sheet 2
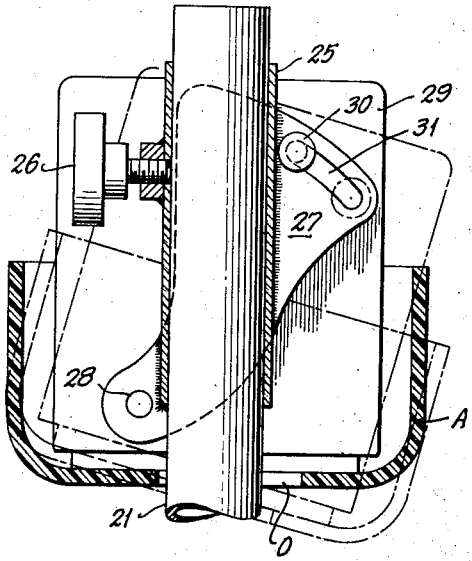
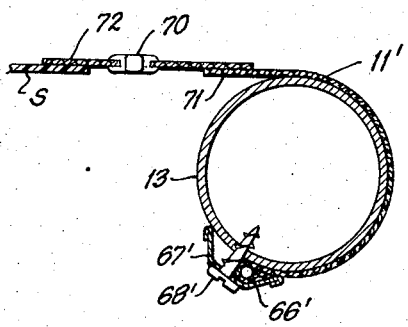
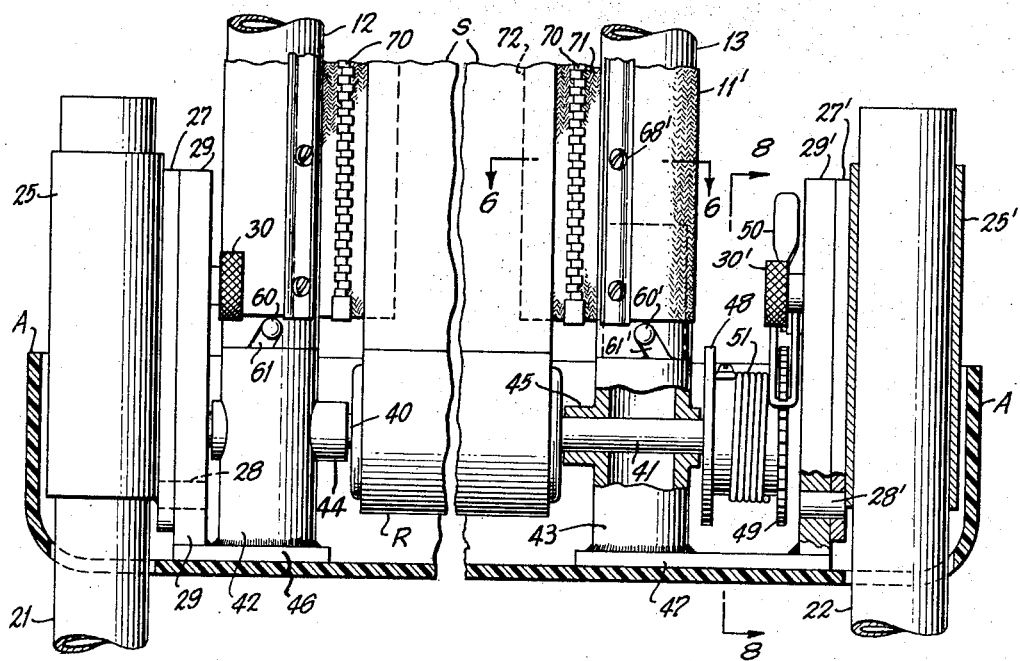
INVENTORS
La Mar Roy Stewart
BY Patrick N. Stewart
ATTORNEY

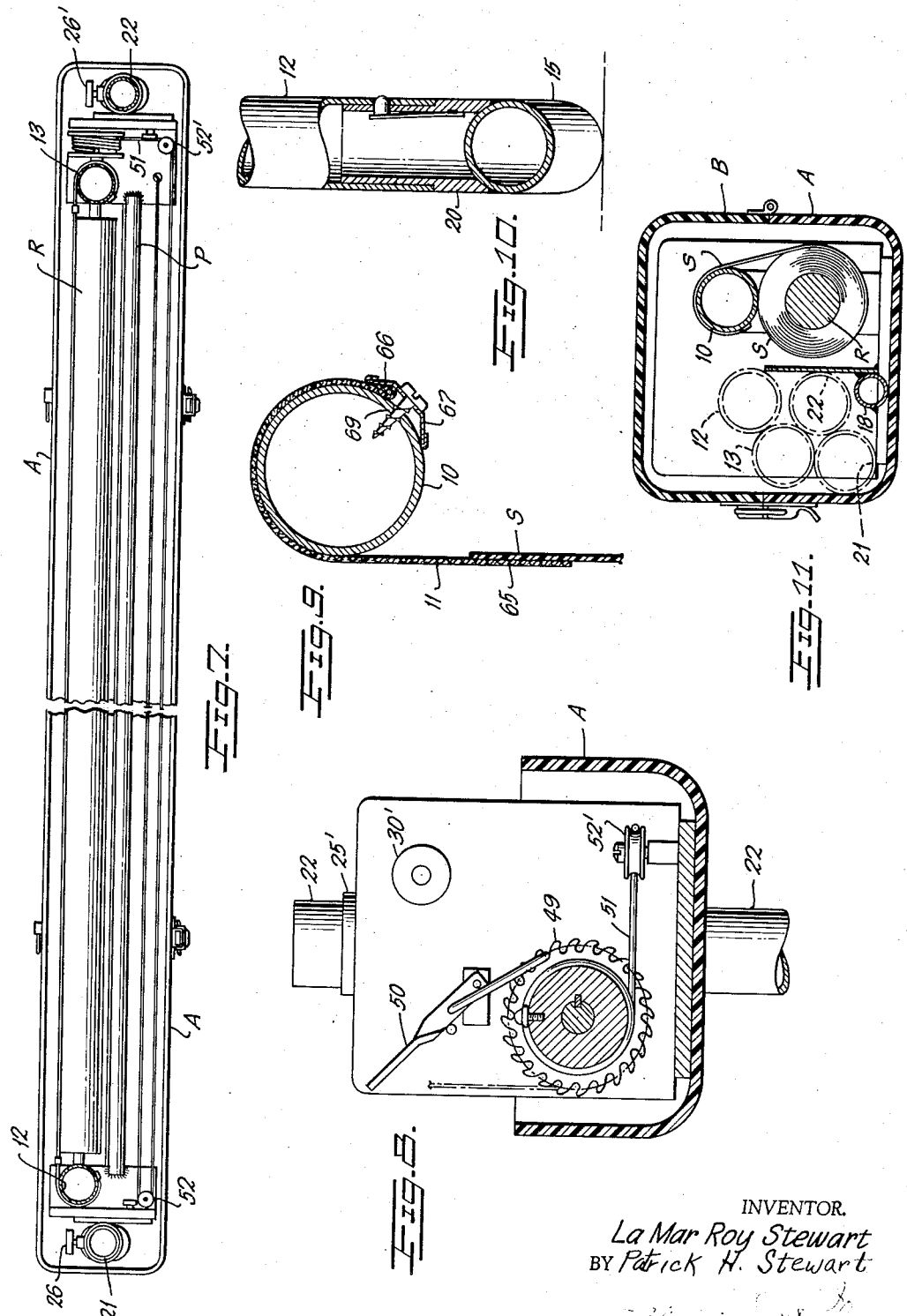

3,144,899
PORTABLE MOTION PICTURE SCREEN
La Mar Roy Stewart, 23208 Robert Road, Torrance, Calif., and Patrick H. Stewart, 5257 Willow Wood Road, Rolling Hills, Calif.
Filed Feb. 26, 1962, Ser. No. 175,729
11 Claims. (Cl. 160—24)

This invention relates to motion picture projection screens and more particularly to such screens that are known in the art as portable screens and has for its object the provision of an improved type of portable motion picture projection screen device or apparatus.

Another object is to provide a portable motion picture projection screen device having a large size projection screen suitable for either indoor or outdoor use and adapted for use with either front or rear projection.

Still another object is to provide a portable projection screen device which may be readily assembled and dis-assembled in which screen means is provided to apply tension about the periphery of the screen sufficient in amount to bring the viewing surface of the screen into the same vertical plane.

A further object is to provide an improved portable projection screen device which in its dis-assembled condition is contained in a compact unitary case or container that may be readily carried around or be readily transported to another location and which in its assembled condition is characterized by having a screen element thereof which is peripherally under tension thereby to provide a viewing surface lying in the same plane, said screen also being adjustable vertically as to viewing height and adjustable about a horizontal axis to vary the viewing angle, said screen also being adapted for either front or rear view projection.

Other objects and advantages will be apparent as the invention is more fully hereinafter disclosed.

Before further disclosure of the invention reference should be had to the accompanying drawings wherein is illustrated one specific embodiment of the invention. In the drawings:

FIG. 1 is a front elevational view of the portable screen device or apparatus of the present invention in its assembled or operational condition;

FIG. 2 is a side elevational view of the same illustrating the extent to which the screen may be tipped or adjusted about a horizontal axis to vary the viewing angle;

FIG. 3 is a perspective view illustrating the portable screen device of the present invention in its fully dis-assembled condition ready for transporting to another location;

FIG. 4 is an enlarged sectional view taken along plane 4—4 of FIG. 1 illustrating the feature of adjustability about a horizontal axis of the screen element of the present invention as shown in FIG. 2;

FIG. 5 is an enlarged longitudinal sectional view having the center section thereof cut-out and the upper part of the screen element cut off to illustrate the cooperative features of the assembly;

FIG. 6 is an enlarged sectional view taken along plane 6—6 of FIG. 5 illustrating another feature of the present invention.

FIG. 7 is an enlarged top plan view of the present invention taken along plane 7—7 of FIG. 1;

FIG. 8 is a sectional view taken along plane 8—8 of FIG. 5;

FIG. 9 is an enlarged sectional view taken along plane 9—9 of FIG. 1;

FIG. 10 is an enlarged sectional view taken along plane 10—10 of FIG. 2;

FIG. 11 is an enlarged sectional view taken along plane 11—11 of FIG. 3; and

FIG. 12 is a view illustrating the plurality of support elements utilized in the assembly of the portable screen device of the present invention.

As may be recognized from the drawings the portable screen device or apparatus of the present invention is adapted in its fully dis-assembled condition to be packed away into a compact case as shown in FIG. 3 for storage or for transportation to a new location and when in its fully assembled condition the screen S thereof is adapted to be adjusted both as to its viewing height and as to its viewing angle as indicated in FIGS. 1 and 2. In addition to these features means are provided to peripherally tension the screen element thereof when in its fully assembled condition thereby to bring the viewing surface of the screen element into the same viewing plane.

One of the primary prerequisites of a portable projection screen device is to provide a case or container therefor into which may be disposed all elements thereof that are necessary and essential to the assembly of the device for operational utility. Such a case or container must be one that is relatively light in weight, small in bulk and readily transportable. This prerequisite is met in the present invention by the provision of a case or container A which is substantially hollow rectangular in shape and square in cross-section and having a removable cover B. The length of the case A with its cover B is substantially greater than the width of the screen S and the cross-sectional area of the case is substantially greater than the diameter of the screen in its fully rolled up condition.

The case contains or is provided with a roller means R for the screen S and has a longitudinally extending partition P therein providing a storage space to contain all of the other elements necessary and essential to the assembly of the screen device in its operational condition. These other elements are those shown in FIG. 12 which consist of inter-engaging and inter-locking tubular parts forming the supporting legs and uprights of the portable screen device of the present invention.

For the purposes of the invention the case A and its cover B are comprised of a relatively strong light weight material and in this specific embodiment is comprised of a molded fiber glass resinous composition which composition, per se, forms no part of the present invention.

Referring now to FIGS. 1, 2 and 4, it may be recognized that the present invention comprises a portable screen device the screen element S of which is adapted to be adjusted as to its viewing height as shown in FIG. 1 and as to its viewing angle as shown in FIGS. 2 and 4. FIGS. 5 and 6 show the details of the screen side tensioning means of the present invention. FIGS. 5, 7, 8 and 9 show the details of the screen top and bottom tensioning means of the present invention. FIGS. 3, 11 and 12 cover the details of the screen invention in its fully dis-assembled condition ready for storage or transporting. FIG. 4 illustrates the details of the means for varying the viewing angle of the screen S. FIG. 10 shows the details of assembling the tubular parts shown in FIG. 12 to provide the means for varying the screen height and FIG. 5 shows the details of mounting the side support standards for the screen element S of the present invention.

Screen elements S of the present invention may be widely varied as to size and composition or type without essential departure from the present invention and for the purposes of this invention may consist of any flexible sheet material capable of being rolled upon a roller and having a suitable viewing surface for the front projection of pictures thereon or a suitable translucency for the rear projection of pictures thereon. There are many different types and kinds of screen elements now available in the art which are utilized in the present invention, some with greater and some with lesser efficiency. In view thereof the screen element, per se, forms no part of the present invention except in so far as it has been improved for utilization therein by the addition thereto of a peripheral tensioning means, the details of which will hereinafter be disclosed in connection with FIGS. 5, 6, 7, 8 and 9.

In the present invention, as illustrated in the specific embodiment of the drawings, the screen S is secured along its bottom edge to the roller R which is rotatively mounted in the container A to be spring urged in the direction to wind the screen S upon the roller R. The upper or top edge of the screen S is secured to a cross-bar or tubular rod 10 by means of a strip of one-way stretch elastic material 11. The direction of stretch of the elastic material 11 is vertical or at right angles to the longitudinal axis of the roller R.

At the ends of the roller R means are provided to detachably mount or secure vertical uprights 12–13 with their longitudinal axes in parallel spaced relation and perpendicular to the longitudinal axis of the roller R and in a vertical plane lying along the roller surface on the side from which the screen S unwinds. The upper ends of vertical uprights 12–13 are provided with means adapted to receive and detachably secure thereon the opposite ends of the cross-bar 10. The lenghts of the vertical uprights 12–13 are identical and are selected relative to the heighth of the screen S to bring the bottom of the screen well above the upper edge of container A. This particular means employed to detachably mount the vertical uprights 12–13 may be widely varied without essential departure from the invention. The specific means illustrated in FIG. 5 is one found to be quite satisfactory.

Means are provided at each end of container A to support the container A with the screen S supported in extended position thereabove at various horizontal levels as indicated in FIG. 1 between dotted line position X and solid line position Y and at any selected viewing angle up to approximately 15° from the vertical. This means comprises feet elements 15, 16 adapted to be detachably and interchangeably secured to co-operating feet elements 17, 18 with each said engaged foot element having a means 19–20 to detachably secure thereon a vertical upright 21, 22. The vertical uprights 21, 22 each passes through an oval slot opening O in the bottom of the container A at each end of the container A and is engaged by a means permitting the container A to be raised or lowered to any selected horizontal level along the length of the uprights 21 and 22. This means, per se, may be widely varied without essential departure from the invention as may also be varied the particular means provided for tipping or adjusting the container A about its horizontal axis to vary the viewing angle.

In the specific embodiment illustrated in the drawings these two means have been combined in a unitary structure for convenience and simplicity. Referring to FIGS. 4, 5 and 7 it will be noted that at each end of container A the tubular uprights 21 and 22 pass through a tubular collar member 25 (25') which is provided with a manually operative set screw means 26 (26') to secure the uprights 21 and 22 in any desired sliding position therein. Tubular collar 25 (25') is secured to sector 27 (27') which is pivotally mounted at its bottom end on transverse partition 29 (29') by pivot pin 28 (28') passing through a pivot opening in the transverse partition 29 (29'). The upper end of sector 27 (27') is provided with a lock-nut and bolt means 30 (30') passing through an elongated arcuate opening 31 (31') in transverse partition 29 (29'). This means 30 (30') comprises the means provided to tip the case A with the screen S mounted thereon from the solid line position to the dotted line position shown in FIGS. 2 and 4. The length of the opening 31 (31') may be varied widely without essential departure from the invention but in most instances it has been found that a length providing a maximum tipping angle of 15° from the vertical is adequate for varying the viewing angle of the screen S. As the same mounting is provided at each end of container A the above disclosure is believed adequate for those skilled in the art.

Referring to FIG. 5, the details of the mounting of roller R and vertical screen supports 12–13 may be noted. Roller R consists of a hollow tubular member R having a length approximating the width of screen S and is rotatively mounted by means of stub shafts 40–41 in tubular uprights 42–43 by means of bearing members 44–45. Tubular uprights 42–43 are secured to the bottom of container A in any convenient way, as by being welded to plates 46–47 to which partitions 29–29' also are secured. Plates 46–47 and partitions 29–29' are formed or are made integral with the case A for rigidity.

Stub shaft 41 is extended beyond tubular support 43 a sufficient distance to permit the mounting on the end thereof of drum 48. The outer rim of drum 48 is provided with ratchet teeth 49 and the adjacent face of partition 29' is provided with a releasable latch means 50 to engage the ratchet teeth 49. A spring-tensioning means 51, which is shown more fully in FIG. 7, is provided to place the screen under re-winding tension. This means 51 consists essentially of a length of flexible cord known in the art as "exercise cord" one end of which is secured to the drum 48 and the other end of which is anchored to the case A, the length of cord between these two ends passing through several pulleys 52–52'. In this arrangement when the screen S is in fully woun-up position on the roller R the cord 51 is free of tension but when the screen S is in fully un-wound position the cord 51 has in part been wound up on drum 48 with the screen placed under tension. The latch means 50 is provided to provide sufficient additional tension on the screen S to straighten the screen and to bring the viewing surface of screen S into vertical alignment and in the same viewing plane.

In FIG. 5 it also may be noted that in this specific embodiment the means provided to detachably mount side tubular support members 12 and 13 in parallel spaced relation on the case A consists of a pin and slot means 60–61 (60'–61'). In this arrangement the inside diameter of supports 12–13 approximates but is bigger than the outside diameter of top terminal portions of tubular supports 42–43 and make sliding contact therewith for a sufficient distance to provide vertical support before the slots 61–61' engage pins 60–60'. Other substantially mechanically equivalent means may be substituted for this arrangement without essential departure from this invention. A plurality of slots 61–61' may be provided also without essential departure from the invention.

Referring now to the means to impart peripheral tension on the screen S thereby to bring the viewing surface of the screen into the same vertical plane, this means consists essentially of two separate means, one for tensioning the screen vertically and one for tensioning the screen horizontally. In each of these means one of the elements thereof consists of one-way stretch material. This material, per se, is old in the art of clothing and has found wide utility in the art of foundation garments, body support garments, and the like. In the adaptation of this one-way stretch material to this new field of utility the material is employed in combination with a means for applying tension.

This combination will first be described as it has been adapted to apply vertical tension on the screen S. In this combination, as illustrated in FIG. 9, the upper edge of screen S is secured in any convenient and effective way, as by the overlapping cement welded joint 65, to the one-way stretch material 11 with the one-way stretch of the material acting at right angles to the longitudinal axis of the tubular support 10. The opposite edge of the one-way stretch material 11 is secured to the support 10 by means of a welted edge portion 66 engaged by channel strip 67 secured onto the support 10 by means of screws 68 passing through openings 69 aligned with the longitudinal axis of the support 10 to provide actuation of the one-way stretch material at right angles to the longitudinal axis of the support 10.

The bottom edge of the screen S is secured in a similar manner to the roller R without the intervening one-way stretch material. With this arrangement, when the support 10 is elevated, with resultant unwinding of the screen S from the roller R against the tension exerted by the exercise cord 51 as it is wound up on drum 48, to the height permitting the support 10 to engage the side supports 12–13 and be retained thereby, the one-way stretch material 11 is placed under tension by the exercise cord 51. By means of ratchet and lock means 50 this tension can be further increased to the degree or extent required or desired to straighten out the horizontally extending wrinkles and irregularities in the screen S.

The vertically extending wrinkles and irregularities in the screen S are eliminated by means of the combination of the one-way stretch material 11' with a tensioning means known in the art as a zipper means. In this combination as illustrated in FIGS. 5 and 6 a length of the one-way stretch material 11' is secured along one side to each of the uprights 12 and 13 in the same manner as heretofore described with respect to FIG. 9. For simplicity in description in FIG. 6 the manner in which the material 11' is secured to the uprights 12 and 13 is identified by primed numbers of those used in FIG. 9. As in FIG. 9, the material 11' is secured to uprights 13 with the one-way stretch thereof operating at right angles to the longitudinal axis of uprights 12 and 13.

The free edge of the material 11' is secured in any convenient manner, as by a cement welded joint 71, to one side of the zipper means 70 and the other side of the zipper means 70 is likewise secured as by a cement welded joint 71 to the side edge of screen S. The same arrangement is provided for vertical support 12 as for support 13. It may be clearly recognized that by providing a length of the one-way stretch material 11' (the stretch factor thereof acting in the direction at right angles to the supports 12 and 13) which is sufficient to tension the material 11' when the zipper means 70 is engaged the side edges of the screen S will be subjected to horizontal tensioning. The amount of tensioning imparted is a function of the space gap closed by the zipper means 70.

Normally it is to be expected that as a result of the winding up of the screen S upon the roller R coupled with the frequency and duration of storage of the screen S in its rolled up condition and with temperature conditions while in its rolled up condition the major portion of wrinkles and surface irregularities in the screen S will be those requiring vertical tension to eliminate and that side or horizontal tensioning is required only to a minor degree or extent to remove edge curls. Accordingly the space gap factor closed by the zipper means 70 is relatively small and substantially non-variable over an extended time period of service use. However, in addition to tensioning the zipper actuated means herein employed also functions and operates to secure the side edges of the screen S from flapping or waving in wind currents when the device is utilized out-of-doors.

It is believed apparent from the above disclosure that the present invention provides a portable picture projection screen combining in addition to portability three other distinct and desirable advantages, namely, adjustability as to viewing heighth, adjustability as to viewing angle and peripheral tensioning of the screen.

Having hereinabove described the present invention generically and specifically and having disclosed and illustrated one specific embodiment thereof, it is believed apparent that many modifications, changes and departures therefrom may be made by those skilled in the art without essential departure from the generic scope thereof and all such changes, modifications and departures from the invention as it has been herein described and illustrated are contemplated as may fall within the scope and purview of the appended claims.

What is claimed is:

1. A portable picture projection screen comprising in combination an elongated hollow rectangular case having a removable cover for one rectangular side thereof, a roller mounted for rotation in said case, a flexible picture projection screen secured at one end to said roller, a cross-bar secured to the opposite end of said screen, two side bars and means to demountably position each said side bars at opposite ends of said roller to extend vertically and in parallel spaced relation above the roller, means at the upper ends of said side bars to receive and demountably secure thereto the opposite ends of said cross-bar, means to releasably apply vertical tensioning to said screen thereby to remove therefrom horizontally extending irregularities in the viewing surface of the screen, said tensioning means also including re-winding tension on said roller, means to releasably apply a sustained horizontal tension to said screen thereby to remove vertically extending irregularities in the viewing surface of said screen and to bring all areas of the screen into the same vertical plane, and a demountable support means for said case, said support means including a means, contained in part in the case, to vary the horizontal level of said case thereby to vary the viewing heighth of said screen between predetermined maximum and minimum limits and means housed in said case to rotate said case about a horizontal axis over selected angle or degree of rotation thereby to vary the viewing angle of the screen between predetermined maximum and minimum limits.

2. The combination of claim 1, with means in said case forming a compartment within which to place and retain the said demountable side bars and the said demountable support means.

3. The combination of claim 1, wherein said means to releasably apply vertical tension to said screen comprises the combination of a strip of one-way stretch material extending the full width of the screen and secured along one edge thereof to the top edge of the screen with the opposite side of the one-way stretch material secured to the said cross bar to stretch only in the vertical direction of the screen and a roller tensioning means opposing the un-winding of the screen from the roller, said roller tensioning means being provided with a ratchet-catch means to apply screen leveling tension onto said one-way stretch material.

4. The combination of claim 1, wherein said means to releasably apply horizontal tension to said screen comprises in combination a strip of one-way stretch material extending the full heighth of said screen to stretch only in the transverse direction of the screen, one said strip for each side of said screen with each said strip having one side secured to one of the side bars and the opposite side thereof secured to one side of a zipper means with the opposite side of each said zipper means being secured to the side edge of said screen adjacent said side bar, the width of said strip being selected to be adapted upon closure of said zipper means to apply to the screen on opposite sides thereof the desired degree of horizontal tension.

5. The combination of claim 1 wherein said demountable support means for said case comprises a pair of uprights and a pair of feet, means to detachably secure the uprights to said feet, the said case-contained part of said support means being at each end of said case to slidingly engage each said upright, means to secure the case in any position of horizontal adjustment, said means to slidingly engage said uprights also including the said means to rotate the case about a horizontal axis, the said means to rotate the case being operative at any position of horizontal level of adjustment of said screen and case.

6. A portable picture projection screen structure, comprising an elongate container having an open top, a pair of upright supports in fixed longitudinally spaced relation in said container, a roller disposed longitudinal in the container between and rotatably mounted at its ends upon said supports, a screen unit comprising a screen element, elongate side uprights and a top crossbar, said side uprights having bottom ends detachably connected to said supports and said crossbar being detachably connected to and between the upper ends of said uprights, said screen element having a bottom end attached to said roller for winding up thereon, the screen element having top and side edges, an elongate elastic element extending across and secured to the top edge of the screen element and secured to said crossbar and being stretchable only in the vertical direction of the screen element, an elongate elastic element secured to each side upright along one longitudinal edge of the element and being stretchable only in the transverse direction of the upright, means for releasably coupling the other longitudinal edge of each upright-attached elastic element to a side edge of the screen and for simultaneously applying stress to and transversely of the screen element and to the attached elastic element to stretch the latter, means connected to said roller and elastically urging rotation thereof in a direction to re-wind the screen element thereon and to simultaneously apply stretching pull to the crossbar-attached elastic element when the crossbar is connected to and between said uprights, and support means for and operatively connected to the container.

7. The invention according to claim 6, with vertical tubular guide elements in the container upon remotely related sides of said upright supports and providing said operative connections between the container and said support means, the said support means comprising vertical uprights each having a top end portion passing upwardly through an opening in the bottom of the container and through a tubular guide element, and means for securing the last named uprights in adjusted position in said guide elements.

8. The invention according to claim 6, wherein each of said upright supports include a vertical partition plate in the container, and said support means operatively connected with the container comprises vertical uprights each extending upwardly through an opening in the bottom of the container and the operative connection between each of the latter uprights and the container includes a tubular guide element in the container through which the associated upright is slidably extended, means for adjustably securing each of the latter uprights in its tubular guide, a sector secured to each tubular guide between the latter and the adjacent partition plate and pivotally joined to the latter whereby the partition plate and container may be turned on an axis extending longitudinally of the container, and means for securing each partition plate and sector against relative turning, the said opening in the bottom of the container being elongated in the transverse direction of the container.

9. The invention according to claim 6, wherein the said means urging said roller in a direction to re-wind the screen element comprises a drum connected to an end of said roller, a length of flexible cord attached at one end to said drum and partially wound therearound and having its other end anchored to the container at a point adjacent to the drum, and said flexible cord having the portion thereof between the drum and said other end passing around at least two pulleys secured to the container and spaced apart in the longitudinal direction of the container.

10. In a portable picture projection screen having a case, a flexible screen mounted on a roller in said case for unwinding therefrom against re-winding tension and means retaining said screen in its un-wound condition against said re-winding tension with the viewing surface thereof in a vertical position for the projection of pictures thereon, the improvement which comprises a demountable frame for said screen, the bottom of said frame being detachably secured to said case and means to apply and maintain a constantly exerted peripheral tension to said screen when in mounted position in said frame thereby to bring all areas of the viewing surface of the screen into the same vertical plane, said peripheral tensioning means being releasable in the vertical direction and detachable in the horizontal direction, said means to apply and maintain a constantly exerted peripheral tension to said screen comprising a releasable ratchet and latch means for increasing the vertical tension on said screen and a releasable zipper means engaging the side edges of said screen to secure same to each side bar of the frame.

11. In a portable picture projection screen having a case, a flexible screen mounted on a roller in said case for unwinding therefrom against re-winding tension and means retaining said screen in its un-wound condition agaist said re-winding tension with the viewing surface thereof in a vertical position for the projection of pictures thereon, the improvement which comprises a demountable frame for said screen, the bottom of said frame being detachably secured to said case and means to apply and maintain a constantly exerted peripheral tension to said screen when in mounted position in said frame thereby to bring all areas of the viewing surface of the screen into the same vertical plane, said peripheral tensioning means being releasable in the vertical direction and detachable in the horizontal direction, said means to apply and maintain a constantly exerted peripheral tension including a strip of one-way stretch material interposed between the upper edge of the screen and the frame and wherein said strips of said one-way stretch material are interposed between the zipper means and each side bar of the frame.

References Cited in the file of this patent

UNITED STATES PATENTS

| | | |
|---|---|---|
| 1,089,611 | Wilson | Mar. 10, 1914 |
| 1,616,928 | Speidel | Feb. 8, 1927 |
| 1,627,906 | Jones | May 10, 1927 |
| 1,776,342 | Weinland | Sept. 23, 1930 |
| 1,795,442 | Raven | Mar. 10, 1931 |
| 1,799,210 | Biaskopf | Apr. 7, 1931 |
| 1,946,639 | Riddell | Feb. 13, 1934 |
| 2,204,028 | Richeda | June 11, 1940 |
| 2,391,871 | Benson | Jan. 1, 1946 |

FOREIGN PATENTS

| | | |
|---|---|---|
| 1,038,731 | Germany | Sept. 11, 1958 |